July 11, 1967   J. H. HENDERSON ETAL   3,330,345
MISCIBLE DRIVE SECONDARY OIL RECOVERY PROCESS
Filed Oct. 5, 1964

INVENTORS.
JAMES H. HENDERSON,
WILLIAM K. MEYER &
JOSEPH J. TABER

United States Patent Office 3,330,345
Patented July 11, 1967

3,330,345
MISCIBLE DRIVE SECONDARY OIL RECOVERY
PROCESS
James H. Henderson, Gibsonia, William K. Meyer, Pittsburgh, and Joseph J. Taber, Indiana Township, Allegheny County, Pa., assignors to Gulf Research & Development Company, Pittsburgh, Pa., a corporation of Delaware
Filed Oct. 5, 1964, Ser. No. 401,579
16 Claims. (Cl. 166—9)

This invention relates to an improved method for displacing oil from an underground rock formation by injecting into the formation a solvent that is substantially miscible in all proportions with both the fluids in the formation and the injected fluid.

The miscible slug process for the displacement of oil from a formation consists of displacing the oil with a predetermined volume, called a slug, of solvent that is driven toward the producing wells be injected water. The recommended solvents, herein referred to as amphipathic solvents, are liquids that are miscible with water in substantially all proportions and are also miscible with oil in substantially all proportions. However, amphipathic solvents presently available at prices allowing their use in a miscible slug process are miscible with mixtures of oil and water only in a narrow range of compositions. Hence, even so-called miscible slug processes involve a two phase flow comprising an oil phase and an aqueous phase from formations initially containing brine. As used herein, the term "brine" includes any type of connate water, whether fresh water or water containing varying amounts of other materials in solution or suspension.

The requisite size of the solvent slug is a major economic factor and depends upon the phase behavior of the fluids, fluid viscosity differences and reservoir heterogeneities. Many methods have been suggested for adjusting the viscosities of fluids displaced through the formation to assure that the oil is displaced by a liquid more viscous than the oil or that successive fluids in the formation exhibit a gradually changing viscosity gradient. Although such methods often improve oil recovery to a limited extent, they are subject to certain disadvantages. For example, such methods often affect the phase behavior of the fluid system adversely and thereby reduce oil recovery. Furthermore, the cost of using a fluid, other than water, having a viscosity greater than that of the formation oil, is often prohibitive.

This invention resides in a process for the recovery of oil from a subterranean rock formation comprising introducing into the formation through an injection well a buffer slug of a hydrocarbon liquid containing a thickening agent, displacing the buffer slug through the formation toward a producing well be injecting behind it a slug of amphipathic solvent that is substantially miscible in all proportions wtih both the injected fluids and the formation fluids, and displacing the amphipathic solvent with a scavenging fluid that generally consists of chemically treated water. The nature of the thickening agent and its concentration in the hydrocarbon liquid are adapted to assure that the buffer slug has the critical viscosity required to assure that the volume of oil displaced is substantially equal to the maximum volume of formation oil recoverable by miscible displacement with the particular amphipathic solvent employed.

This invention can be explained more fully with reference to the accompanying drawings, wherein FIGURE 1 shows the effect on oil recovery of the viscosity of the oil displaced by an amphipathic solvent.

Figure 1:
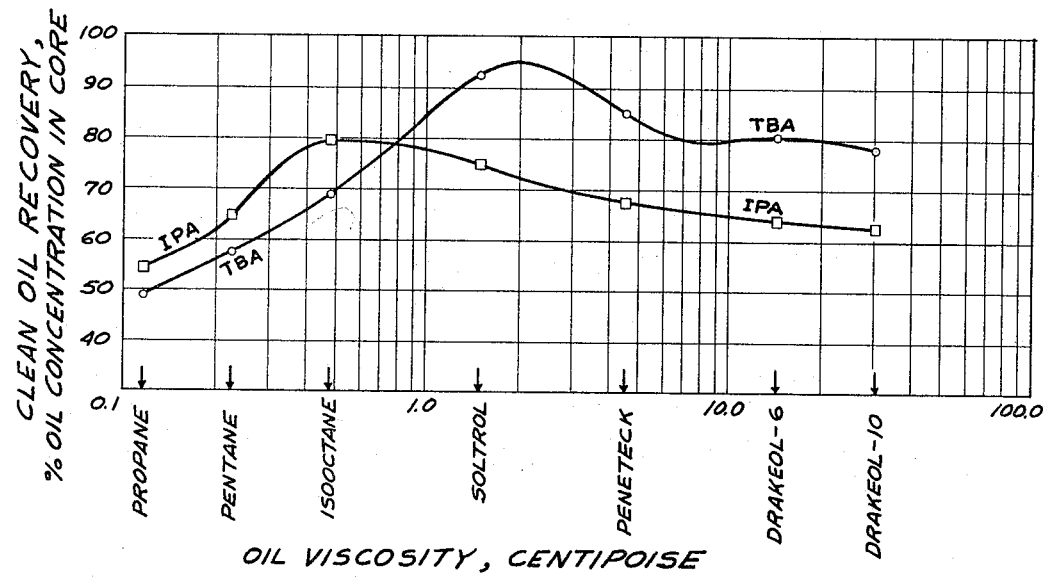

It is characteristic of miscible slug processes in formations containing oil and brine that as the liquids advance through the formation, four distinct zones are formed and move toward the producing wells. The initial zone, called the oil zone, consists of pure oil because the connate brine in this region is discontinuous and hence has no mobility. If the formation has been water flooded to the residual oil concentration, the initial zone is comprised solely of brine. In either event, the initial zone is followed by a stabilized zone of two phase flow in which oil and brine flow in almost constant proportion. This is followed by a transition zone in which the solvent dissolves in the oil and in the brine, and the proportions of brine phase and oil phase flowing vary as the solvent concentration increases. Eventually, the liquids achieve miscibility and form a single flowing phase which constitutes the fourth zone. With respect to this invention, a description of succeeding fluids in the flood process is not pertinent and the fourth zone can be treated as one in which the flowing liquids behind the transition zone grade into pure solvent and subsequently into water.

We have found that, in an amphipathic solvent displacement process, the recovery of oil is affected by the viscosity of the oleic phase immediately displaced by the solvent. The term "oleic" is used herein to denote a liquid consisting essentially of, or having properties similar to, mineral oil. With a particular amphipathic solvent, the volume of oil recoverable attains a maximum value for a specific viscosity of the displaced oleic phase. That specific value of viscosity is referred to herein as the critical oil viscosity and denotes the viscosity at which the volume of oil displaced is substantially equal to the maximum volume of formation oil recoverable by miscible displacement with the particular amphipathic solvent employed. In the range of oil viscosities less than the critical viscosity, the volume of oil displaced by the solvent increases with increasing viscosity and reaches a maximum at the critical viscosity. In the range of oil viscosities greater than the critical viscosity, the volume of oil displaced by the solvent decreases with increasing viscosity.

The effect of displaced oil viscosity upon oil recovery by a particular amphipathic solvent is shown by the results of a series of displacement tests conducted in Berea sandstone cores. The cylindrical surfaces of the cores were sealed with Hysol resin, marketed by the Hysol Corporation, Olean, N.Y. Then the cores were individually encased in a low melting alloy inside steel tubing. The cores were initially saturated by displacing the air therein with 30 to 60 pore volumes of carbon dioxide and then flooding the cores with deaerated brine containing two percent calcium chloride by weight.

After the cores were saturated with brine, high oil concentrations in the cores were achieved by flooding the cores with oil until the oil to water production ratio was 25 or greater. Then the oil concentration in the core was reduced to residual oil concentration by flooding the core with brine until oil production ceased. Fluid concentrations were determined by a volumetric measure of the produced fluids. The displacing solvent was continually injected at a volumetric rate corresponding to a linear velocity of 12 feet per day. The produced fluids were examined by refractive index measurements to detect the presence of alcohol, and oil production prior to alcohol production was designated as clean oil.

Two series of tests were made wherein a particular solvent was used to displace hydrocarbon liquids having different viscosities. The results of those tests are indicated in FIGURE 1. In one series of tests, tertiary butyl alcohol was used to displace a number of different hydrocarbon liquids, the viscosity of each liquid being in the range of from approximately 0.2 centipoise for pentane to approximately 29.6 centipoises for Drakeol–10. As is shown in FIGURE 1, when tertiary butyl alcohol is used to displace oil, the volume of oil recovered up to the time alcohol appears in the effluent stream depends upon the viscosity of the oil displaced by the alcohol. The volume of oil recovered is greater for oils of higher viscosity up to a critical viscosity of approximately two centipoises. For more viscous oils the volume of oil recovered decreases as the viscosity of the oil increases.

In another series of tests, isopropyl alcohol was used as the displacing solvent. The volume of oil recovered as a result of displacement by isopropyl alcohol also varies with the viscosity of the oil displaced by the alcohol, and attains a maximum when the viscosity of the displaced oil is approximately 0.5 centipoise. Thus the experimental results presented in FIGURE 1 indicate that, in a liquid system containing a particular amphipathic solvent and a particular formation brine, the recovery of oil varies with the viscosity of the oil displaced and attains a maximum at a critical oil viscosity.

The existence of a critical oil viscosity in the displacement of oil by an amphipathic solvent is the result of the effect of the average molecular weight of the displaced oil on both the oil viscosity and the phase behavior in the liquid system comprising the solvent, brine and oil. As the average molecular weight of the oil increases, the viscosity of the oil increases and the oil becomes less soluble in solvents and in water. Not only do the higher molecular weight oils require more solvent for miscibility but the plait point on the binodal curve shifts from left to right as the average molecular weight of the oil increases, thereby decreasing the tendency of the solvent to produce an expanding oil phase displacement, a process that is explained more fully below. Moreover, with oils of higher viscosity, the tendency of the displacing solvent to finger through the formation and by pass isolated ganglia of oil is greater and tends to reduce oil recovery. Thus, if the buffer slug viscosity is too great, the solvent will finger through the buffer and into the formation oil ahead of the buffer slug, thereby causing bypassing of formation oil, premature breakdown of the solvent slug and the loss of miscibility of the fluids flowing behind the transition zone. However, as the results presented in FIGURE 1 indicate, the critical viscosity of the displaced oil can be determined by core tests using samples of the formation fluids and the particular solvent selected.

According to the process of this invention, displacement immediately ahead of the amphipathic solvent of an oil having the critical viscosity is assured by injecting into the formation ahead of the solvent a buffer slug comprising a mixture of a light hydrocarbon liquid containing a thickening agent. Because the buffer slug is oleic in nature it is miscible with the formation oil and substantially immiscible with the formation brine. Consequently the buffer slug replaces the formation oil in the pore spaces ahead of the solvent, and a bank of oil builds up at the leading edge of the buffer slug. The leading edge of the amphipathic solvent slug contacts a mixture of brine and a light hydrocarbon having the critical viscosity at the trailing edge of the buffer slug.

A hydrocarbon liquid is suitable for use as the buffer slug if its viscosity is less than the critical viscosity for the particular solvent employed. For example, with isopropyl alcohol as the solvent, a suitable buffer liquid has a viscosity less than about 0.5 centipoise, the viscosity of isooctane, and aliphatic hydrocarbons having less than about eight carbon atoms per molecule could be used. With tertiary butyl alcohol as the solvent, a suitable buffer liquid has a viscosity less than about two centipoises, the approximate viscosity of Soltrol, and aliphatic hydrocarbons having less than about ten carbon atoms per molecule could be used in the buffer slug. However, it is preferred to inject a buffer slug containing a hydrocarbon liquid, or a mixture of hydrocarbons, having six or less carbon atoms per molecule because of their availability and relatively low cost and because such hydrocarbons of lower molecular weight tend to reduce the amount of solvent needed to sustain miscibility during the subsequent displacement of the pure solvent by the following water. A particularly desirable buffer liquid is the mixture of hydrocarbons commonly known as liquefied petroleum gas or LPG, consisting of hydrocarbons having two to six carbon atoms per molecule, principally propane and butane with minor amounts of ethane and pentane, and possibly lesser amounts of methane and hexane and heavier hydrocarbons. In the formation, LPG without a thickening agent has a viscosity of from about 0.07 to about 0.15 centipoise.

Highly perferred liquid hydrocarbons for this process are hydrocarbons having six or less carbon atoms per molecule and containing high concentrations of aromatics such as benzene. Highly aromatic hydrocarbons have an advantage over other hydrocarbons in that the former tend to shift the plait point of the resultant ternary diagram to the left thereby reducing the tendency to produce an expanding aqueous phase.

The thickening agent must be capable of raising the viscosity of the buffer hydrocarbon to the critical viscosity for the amphipathic solvent used. Because the thickening agent acts as a fourth component in the liquid system, the thickening agent must have physical and chemical properties that do not significantly interfere adversely with the phase behavior of the liquids. Therefore, the molecules of thickening agent must be small enough to assure that the thickening agent does not disrupt the miscibility relationship at the concentration of thickening agent required and to assure that the thickening agent does not adhere to the rock surfaces of the formation by chromatographic adsorption thereon. Examples of thickening agents suitable for use in the process of this invention are polymethyl laurylate, polyalkyl styrene, polybutadiene, and the bivalent or trivalent metallic soaps of monocarboxylic acids having 14 or more carbon atoms per molecule. With regard to the amphipathic solvents tested, the above-named thickening agents are capable of raising the viscosity of light hydrocarbons to the critical viscosity at concentrations less than 0.25 percent by volume of thickening agent in hydrocarbon liquid. Preferred thickening agents are the members of the class of n-alkyl-gamma-hydroxybutyramides marketed by General Aniline and Film Corporation under the trade names AT–339, AT–41, AT–342, and AT–343. Those thickening agents are capable of raising the buffer slug viscosity to the critical value at concentrations of thickening agent within the range of from about 0.01 to about 0.1 percent by volume with little effect upon the phase behavior of the liquid system.

With many miscible and immiscible displacement processes heretofore available, it has been recommended that each fluid in the formation be displaced by a more viscous fluid. In particular, it has been recommended that the viscosity of the oil or the liquid immediately ahead of the solvent be reduced to as low a value as possible or that the formation oil be immediately displaced by a fluid that is more viscous than that oil. In other processes in which the ultimate displacing fluid, sometimes called the scavenging fluid, is a gas, it has been recommended that a series of slugs be displaced through the formation, each slug having a viscosity slightly less than the slug preceding it. In other words such processes describe the creation of a gradually decreasing viscosity gradient.

The process of our invention, wherein a thickened buffer slug having the critical oil viscosity is displaced by an amphipathic solvent, differs from such processes described in the prior art in that our process is not based upon relative viscosities between succeeding fluids in the formation. It is the object of our invention to provide a thickened buffer slug that has the specific critical viscosity for the effect of fluid dynamics; e.g., fingering, and phase behavior of the fluid system involved. As is indicated in FIGURE 1, merely reducing the viscosity of the formation oil or injecting displacing liquids more viscous than the formation oil without providing a slug having the critical viscosity immediately ahead of the solvent does not assure that the volume of oil displaced will be substantially equal to the maximum volume of formation oil recoverable by miscible displacement with the particular solvent used.

Our invention consists of displacing oil from a formation by injecting ahead of an amphipathic solvent a buffer slug containing a thickening agent adapted to raise the viscosity of the buffer liquid to the critical viscosity for the solvent used and displacing the amphipathic solvent with scavenging fluid normally consisting of chemically treated water. The invention can be practiced in any of several embodiments that will now be explained more fully.

Figure 2:
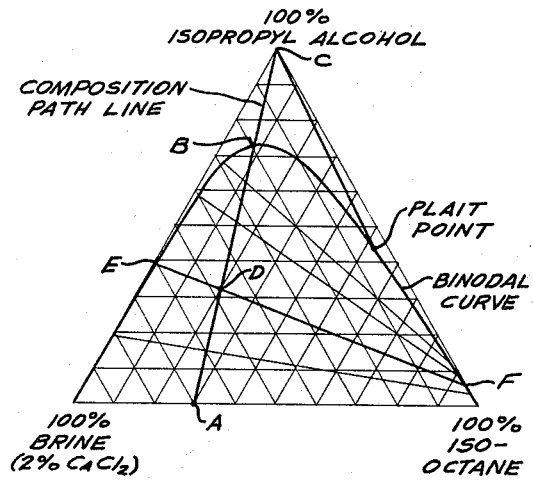
FIGURE 2 is a ternary phase diagram for a system of liquids comprising isopropyl alcohol, isooctane, and two percent calcium chloride brine during an expanding aqueous phase process.
Figure 3:
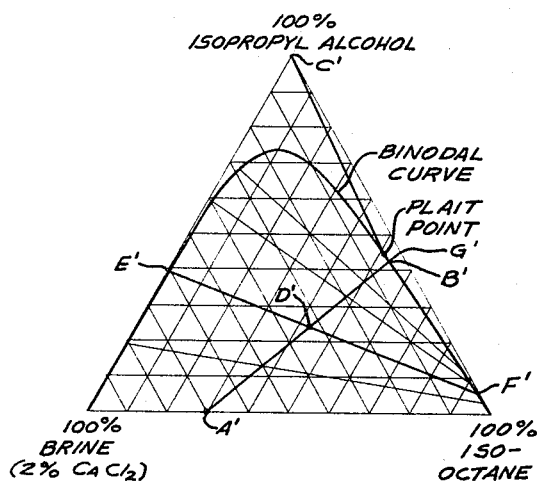
FIGURE 3 is a ternary phase diagram for a system of liquids comprising isopropyl alcohol, isooctane, and two per cent calcium chloride brine showing the path followed by the compositional fluids in the formation during an expanding oil phase process.

The ternary diagrams of FIGURES 2 and 3 illustrate the phase behavior of the liquids in the transition zone and in the miscible zone ahead of the pure solvent. All references to ternary diagrams herein are to diagrams showing 100 percent brine at the lower left angle, 100 percent solvent at the upper angle, and 100 percent oil at the lower right angle of the diagram. FIGURE 2 represents a process in which a slug of isopropyl alcohol is displaced by water through a formation containing isooctane and calcium chloride brine. Mixing at the leading edge of the solvent slug forms an oil-brine-solvent transition zone preceding the pure solvent. At a point in the formation just ahead of the transition zone; i.e., in the stabilized zone, oil and brine are present at concentrations indicated by point A on the oil-brine side of the diagram. As the transition zone passes this point in the formation, the mixture of solvent, oil, and brine follows the composition path of line AC, and phase relationships in the transition zone are indicated by the relation between the composition path line segment AB and tie-lines such as EF. For example, when liquid concentrations in the transition zone are indicated by point D, the ratio of volumes of oil phase to brine phase equals the ratio of tie-line segments ED to DF. As the liquids approach the miscible region, tie-line segments representing the proportion of oil phase decrease in length and vanish as miscibility is achieved. This occurs because, as solvent concentration increases in an equilibrium system as is represented by the ternary diagram, the brine phase continues to grow until the oil phase disappears when the system has the composition B, at which line AC crosses the binodal curve. Because of the eventual dominance of the brine phase, such processes are referred to as expanding aqueous phase miscible slug processes.

In the expanding aqueous phase process the oil volume flowing in the formation decreases until the oil phase becomes discontinuous and remains discontinuous during te rest of the flooding. Consequently, the formation permeability to oil vanishes, and the oil phase is present behind the transition zone in isolated ganglia that remain immobile in the formation while the continuous brine phase is dispaced. Thus oil recovery resulting from an expanding aqueous phase process is reduced because of the volume of oil that is left immobile in the reservoir.

Miscible flooding processes exhibit an expanding aqueous phase when the liquid mixture in the transition zone follows a composition path line that interesects the binodal curve at a point to the left of the plait point as shown in FIGURE 2. The composition path line, A'B' in FIGURE 3 indicates that, if the liquids in the transition zone achieve miscibility through a region lying to the right of the plait point, the tie-line segments such as D'F', representing the proportion of brine phase, eventually vanish. In such a system the brine phase becomes discontinuous, and the oil phase remains continuous and mobile as the liquids achieve miscibility. A process with such characteristics is referred to as an expanding oil phase miscible slug process. Tertiary butyl alcohol is representative of the class of amphipathic solvents that can produce an expanding oil phase during the miscible displacement of oil from a formation.

Suitable solvents for use in the various embodiments of this invention are those that are substantially miscible in all proportions with both the injected fluids and the formation fluids. Because the individual formation fluids and the individual injection fluids are either oleic or aqueous in nature, a suitable amphipathic solvent can be defined also as one which is substantially miscible in all proportions with both oil and water. Solvents having the desired miscibility with oil and also with water are in most instances low molecular weight oxygenated organic liquids. Of those compounds, the monohydroxy alcohols having from one to four carbon atoms per molecule are preferred amphipathic solvents because of their availability and relatively low cost, and isopropyl alcohol is the preferred alcohol. Because such alcohols usually form a system with brine and formation oil in which the plait point is to the right of the binodal peak, the composition path of the system as the solvent is mixed with the water-oil mixture in the stabilized zone passes to the left of the plait point and, hence, results in an expanding aqueous phase. Other amphipathic solvents that are miscible with both water and oil, such as acetone, dioxane, acetaldehyde, and ethylene oxide, also produce an expanding aqueous phase. However, tertiary butyl alcohol has the advantage that, with some formation oils and brines, it produces an expanding oil phase.

Preferably the amphipathic solvent employed is one that provides an expanding oil phase to assure higher recoveries of oil. However, in some instances the high costs of solvents, such as teriary butyl alcohol, that provide an expanding oil phase displacement precludes the use of such solvents. We have found that an expanding aqueous phase process can be converted to an expanding oil phase process by injecting a slug of amphipathic solvent mixed with a hydrocarbon ahead of the pure amphipathic solvent. The term, "pure solvent," distinguishes the solvent slug from the solvent to which hydrocarbons are deliberately added to provide an expanding oil phase. Solvents, or mixtures of solvents, containing impurities or even incidental amounts of hydrocarbons are referred to herein as pure solvents.

FIGURE 3 is a ternary diagram for the isooctane, calcium chloride brine, and isopropyl alcohol system showing the path of fluid composition through the transition zone when displaced by a slug of isopropyl alcohol mixed with isooctane followed by a slug of pure isopropyl alcohol. FIGURE 3 is also qualitatively representative of the fluid composition changes occurring during the displacement of oil with an amphipathic solvent such as tertiary butyl alcohol alone. The diagram indicates that, when the transition zone contacts the formation liquids at concentrations indicated by point A', the added hydrocarbon gradually increases the oil concentration, and the liquids are forced to approach miscibility along a composition path that intersects the binodal curve at B' to the right of the plait point. As miscibility is achieved, tie-line segments such as D'F', representing the proportion of brine phase in the transition zone, decrease in length and ultimately vanish. Eventually, the brine phase volume decreases to the point that the brine phase becomes discontinuous and formation permeability to brine does not exist. The brine phase remains behind the flood front in isolated ganglia, and the oil phase expands in volume and constitutes the sole, continuous flowing phase as miscible displacement is achieved. This results in increased recovery of oil from the formation.

The liquid hydrocarbons that are suitable for mixing with an amphipathic solvent to convert an expanding aqueous phase process into an expanding oil phase process are the same as the liquids suitable as a buffer hydrocarbon to provide the critical displaced oil viscosity. To assure an expanding oil phase, the hydrocarbon is mixed with the solvent in a predetermined amount designed to induce a path of the formation fluid composition passing to the right of the plait point. Referring to FIGURE 3 of the drawings, the injected mixture should have a concentration of oil slightly in excess of that indicated by the intersection of a line from A' through the plait point with the side of the ternary diagram connecting the 100 percent solvent and 100 percent oil vertices. A line constructed to indicate the proper oil concentration would be one such as line A'G'. The concentration of hydrocarbon required in the injected-solvent-hydrocarbon mixture can be determined by a series of bottle tests in which samples of formation oil and water typical of the stabilized zone composition are mixed with oil-solvent solutions of increasing oil concentration until the concentration of oil required to form an expanding oil phase is determined.

The sizes of the viscosity buffer slug, the slug of hydrocarbon oil mixed with solvent and the following slug of pure solvent are designed to avoid complete breakdown of the slugs until they traverse a sufficient distance in the formation to obtain the benefits of the critical viscosity and miscible displacement through the entire formation volume swept by the flooding process. A slug having a volume of from about two to about twenty percent of the formation pore volume ordinarily should be used. As with the proper slug compositions, the slug sizes are determined for each formation by preliminary core flooding tests.

FIGURE 1 indicates a critical viscosity for both isopropyl alcohol and tertiary butyl alcohol. Isopropyl alcohol normally produces an expanding aqueous phase displacement while tertiary butyl alcohol produces an expanding oil phase displacement. If the solvent employed is one such as isopropyl alcohol that produces an expanding aqueous phase, then the buffer slug consists of a hydrocarbon liquid having six or less carbon atoms per molecule and containing a small concentration of a thickening agent. Certain types of buffer slugs, such as one containing thickened benzene, affect the phase behavior of the miscible system favorably by reducing the amount of solvent required for miscibility and by shifting the plait point so as to reduce the tendency of the aqueous phase to expand, thereby reducing the volume of oil trapped in the formation behind the transition zone. In any event, an improvement in oil recovery is provided even when the only effect of the buffer is to provide the critical oil viscosity ahead of the solvent in an expanding aqueous phase system.

In a second embodiment of this invention, an amphipathic solvent, such as tertiary butyl alcohol, is used that alone produces an expanding oil phase. In such a process also the buffer slug contains a hydrocarbon having six or less carbon atoms per molecule, mixed with a thickening agent. However, where an expanding oil phase solvent is used, care must be taken to assure that the composition of the buffer slug does not significantly affect adversely the phase behavior of the system by shifting the plait point to the left on the binodal curve of the ternary diagram and thereby converting the expanding oil phase to an expanding aqueous phase. As is evident from the discussion above, the recovery of oil can be greatly enhanced by a miscible displacement process that produces an expanding oil phase and also has an oleic phase having the critical viscosity immediately displaced by the solvent slug.

The volume of clean oil recovered as reported in FIGURE 1 is substantially equal to the total oil recovery because of the nature of the displacement process in the formation. The volume of clean oil recovered represents the combined volumes produced in the pure oil zone and the volume of oil flowing in the stabilized zone ahead of the transition zone. That combined volume of oil comprises substantially all of the oil recovered in a particular miscible slug displacement process, although a small amount of recoverable oil is produced in the transition zone following the stabilized bank. In that regard, providing an expanding oil phase displacement process is desirable because sustaining a mobile expanding oil phase in the transition zone causes increased flow of oil in the transition zone with a high oil concentration at the leading edge, and part of the formation oil ahead of that zone forms a bank that increases in length and results in a larger volume of oil flowing in the stabilized and pure oil zones. In that manner a larger volume of oil is displaced from the formation volume contacted by the solvent slug.

A third embodiment of this invention involves a combination of the critical viscosity process with the method for converting an expanding aqueous phase process into an expanding oil phase process. In that embodiment, the slug of pure solvent is preceded in the formation by a mixed slug of amphipathic solvent containing a thickened hydrocarbon liquid having the critical viscosity. A suitable buffer slug for such a process comprises a slug of isopropyl alcohol mixed with a hydrocarbon having six or less carbon atoms per molecule and containing a thickening agent such as an n-alkyl-gamma-hydroxybutyramide. As with other expanding oil phase processes, care must be exercised to assure that the materials employed in the buffer slug do not excessively effect adversely the formation of an expanding oil phase.

The preceding description defines our invention of an improved miscible slug process comprising introducing into the formation through an injection well a buffer slug of a hydrocarbon liquid having six or less carbon atoms per molecule and containing a thickening agent adapted to raise the viscosity of the buffer liquid to the critical displaced oil viscosity for the solvent used, and displacing the buffer slug with a slug of pure amphipathic solvent that is itself displaced with water. Various modifications of the invention described herein are possible and will be obvious to one skilled in the art in determining the proper method to use for a particular formation and fluid characteristics. For example, the use of an amphipathic solvent other than one of the named monohydroxy aliphatic alcohols might facilitate the use of a scavenging fluid other than water. The fact that the scavenging fluid employed is a material such as hydrocarbon gas or an inorganic gas or vapor does not interfere with the inventive concept of this invention and is within the purview of this invention and the following claims.

Therefore we claim:

1. In a method of recovering fluid from a subterranean rock formation, penetrated by an injection well and a remotely located producing well, by introducing into the formation through the injection well a selected hydrocarbon liquid having six or less carbon atoms per molecule, thereafter displacing the hydrocarbon liquid through the formation toward a producing well by injecting behind the hydrocarbon liquid a selected solvent which is substantially miscible in all proportions with the injected fluids and with the formation fluids, thereafter displacing the selected solvent through the formation toward a producing well by injecting water behind the selected solvent, lowering the pressure within the producing well and producing fluids which enter said producing well the improvement comprising:

adding a thickening agent to the selected hydrocarbon liquid to form a mixture having a viscosity equal to the critical oil viscosity for the rock formation, the formation fluids and the selected solvent.

2. A method of recovering fluid from a subterranean rock formation containing oil, penetrated by an injection well and a remotely located producing well, by injecting, down the injection well and into the formation toward the producing well, a selected hydrocarbon having not more than six carbon atoms per molecule, a selected solvent and a floodwater comprising:

injecting, down the injection well and into the formation, the selected hydrocarbon having a viscosity, adjusted by adding a thickening agent, equal to the critical oil viscosity for the rock formation, formation fluids and the selected solvent;

thereafter displacing the hydrocarbon through the formation toward a producing well by injecting behind the hydrocarbon an amphipathic solvent which assures that, as said solvent forms a brine-solvent phase and an oil-solvent phase in a transition zone ahead of said solvent, said oil-solvent phase increases in volume;

thereafter displacing the amphipathic solvent toward the producing well by injecting the floodwater behind the amphipathic solvent;

lowering the pressure within the producing well; and producing fluids which enter said producing well.

3. A method according to claim 2 wherein the concentration of thickening agent in the hydrocarbon liquid is adapted to assure that the thickening agent does not destroy the miscibility of the solvent with the formation fluids.

4. A method according to claim 2 wherein the hydrocarbon liquid is LPG.

5. A method according to claim 2 wherein the hydrocarbon liquid is benzene.

6. A method of recovering fluid from a subterreanean rock formation containing oil, penetrated by an injection well and a remotely located producing well, by injecting, down the injection well and into the formation toward the producing well, a selected hydrocarbon, solvent and floodwater comprising:

injecting the selected hydrocarbon and an added thickening agent downwardly through the injection well and into the formation, said hydrocarbon having not more than six carbon atoms per molecule and having a viscosity equal to the critical oil viscosity for the rock formation, formation fluids and the selected solvent;

thereafter displacing the hydrocarbon liquid through the formation toward a producing well by injecting behind the hydrocarbon liquid a tertiary butyl alcohol solvent; and thereafter displacing the alcohol through the formation toward the producing well by injecting floodwater into the formation behind the alcohol solvent.

7. A method as set forth in claim 6 wherein the thickening agent is n-alkyl-gamma-hydroxybutyramide.

8. A method according to claim 6 wherein the hydrocarbon liquid is LPG.

9. A method of recovering oil from a subterranean rock formation by injecting through the formation a selected hydrocarbon liquid and thickening agent mixture, a selected solvent and floodwater comprising:

introducing into the formation through an injection well the hydrocarbon liquid and thickening agent mixture, said hydrocarbon liquid having from one to about six carbon atoms per molecule and said resultant hydrocarbon liquid and thickening agent mixture having a viscosity equal to the critical oil viscosity for the rock formation, formation fluids and the selected solvent;

thereafter displacing the hydrocarbon liquid and thickening agent mixture through the formation toward a producing well by injecting behind said mixture an isopropyl alcohol solvent; and thereafter displacing the alcohol toward the producing well by injecting floodwater into the formation behind the alcohol solvent.

10. A method of recovering oil from a subterranean rock formation by injecting through the formation a selected LPG, solvent and floodwater comprising:

introducing into the formation through an injection well a mixture of the selected LPG and a thickening agent, said LPG and thickening agent mixture having a viscosity equal to the critical oil viscosity for the rock formation, formation fluids and the selected solvent;

thereafter displacing the LPG mixture through the formation toward a remotely located producing well by injecting behind the LPG an isopropyl alcohol solvent; and thereafter displacing the alcohol toward the producing well by injecting floodwater into the formation behind the alcohol solvent.

11. A method as set forth in claim 10 wherein the thickening agent is n-alkyl-gamma-hydroxybutyramide.

12. A method of recovering oil from a subterranean oil and brine containing rock formation by injecting through the formation a selected hydrocarbon and solvent mixture, a solvent and a floodwater comprising:

introducing into the formation through an injection well a hydrocarbon-amphipathic solvent and a thickening agent mixture, said mixture having a viscosity equal to the critical oil viscosity for the rock formation, formation fluids, the hydrocarbon-solvent mixture and the solvent;

thereafter displacing the hydrocarbon-amphipathic solvent mixture through the formation toward a producing well by injecting behind said mixture an amphipathic solvent; and thereafter displacing said amphipathic solvent toward the producing well by injecting floodwater behind the amphipathic solvent, wherein said mixture forms a transition zone with said oil and brine ahead of said amphipathic solvent and adjusts the liquid concentrations in said transition zone such that, as said liquids achieve miscibility, an oil-solvent phase is formed which increases in volume and is displaced toward the producing well by the amphipathic solvent.

13. A method as set forth in claim 12 wherein the thickening agent is n-alkyl-gamma-hydroxybutyramide.

14. A method according to claim 12 wherein the amphipathic solvent is isopropyl alcohol.

15. A method according to claim 12 wherein the hydrocarbon is LPG.

16. A method of recovering fluid from a subterranean rock formation by injecting through the formation a selected hydrocarbon liquid and thickening agent mixture, solvent and scavenging fluid comprising:

introducing into the formation through an injection well the hydrocarbon liquid-thickening agent mixture, said mixture having a viscosity equal to the critical oil viscosity for the rock formation, formation fluids, the selected hydrocarbon liquid-thickening agent mixture, and solvent;

thereafter displacing said mixture through the formation toward a producing well by injecting behind said mixture an amphipathic solvent that is substantially miscible in all proportions with the injected fluids and the formation fluids; and thereafter displacing the solvent through the formation toward a producing well by injecting behind said solvent a scavenging fluid that is substantially miscible with the solvent in all proportions.

(References on following page)

References Cited

UNITED STATES PATENTS

| | | | |
|---|---|---|---|
| 2,742,089 | 4/1956 | Morse et al. | 166—9 |
| 3,074,481 | 1/1963 | Habermann | 166—9 X |
| 3,177,939 | 4/1965 | Holm et al. | 166—9 |
| 3,181,609 | 5/1965 | Csaszar et al. | 166—9 |
| 3,220,474 | 11/1965 | Holm | 166—9 |
| 3,221,810 | 12/1965 | Marx | 166—9 X |

OTHER REFERENCES

Slobod et al.: "Modification of the Alcohol Slug Process For Application to the Bradford Reservoir," Producers Monthly, January 1962, pages 2 to 6.

CHARLES E. O'CONNELL, *Primary Examiner.*

S. J. NOVOSAD, *Assistant Examiner.*